UNITED STATES PATENT OFFICE.

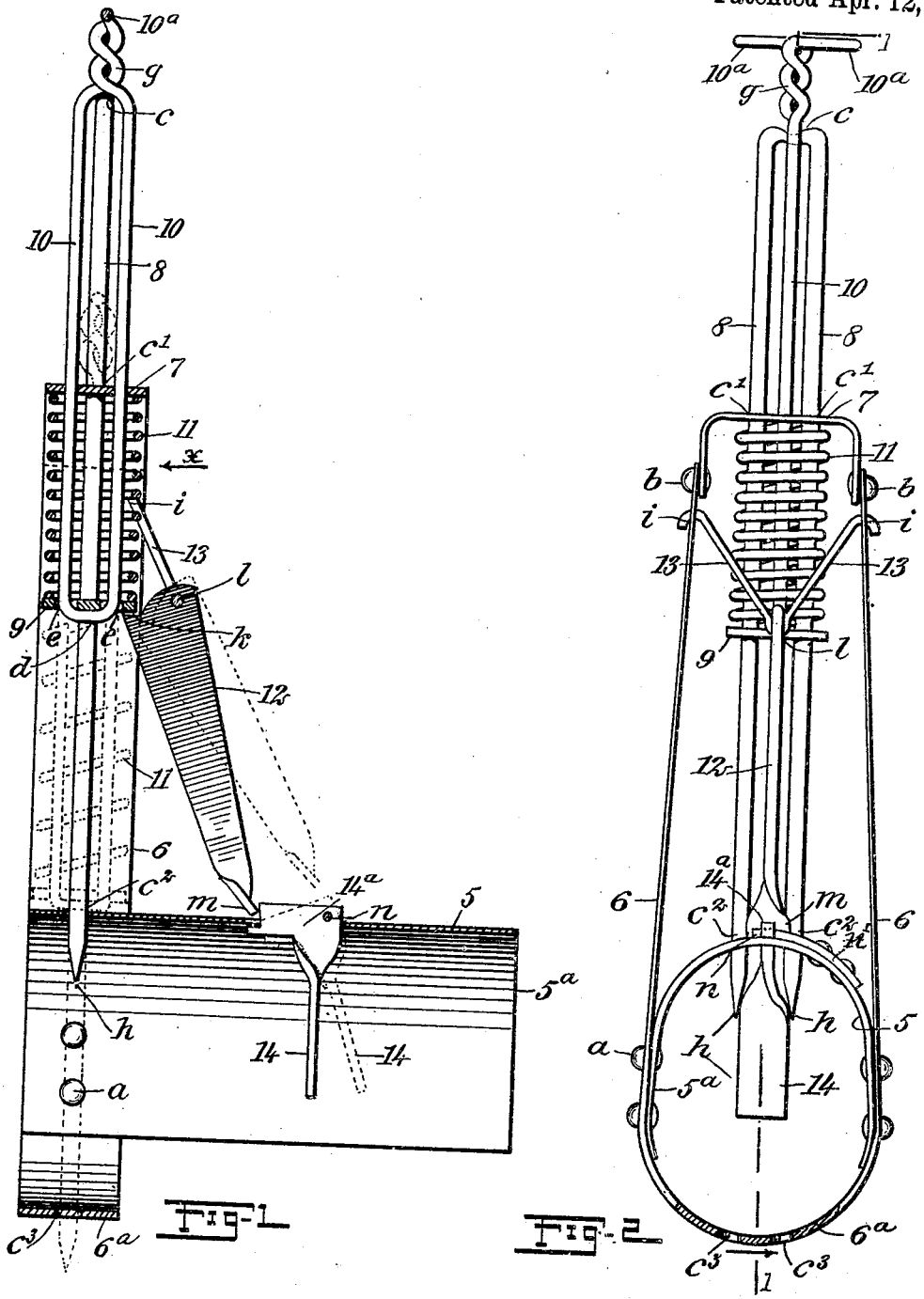

ANTON F. RENKEN, OF KRAMER, NEBRASKA.

GOPHER-TRAP.

954,996.  Specification of Letters Patent.  Patented Apr. 12, 1910.

Application filed April 8, 1909. Serial No. 488,606.

*To all whom it may concern:*

Be it known that I, ANTON F. RENKEN, a citizen of the United States, and a resident of Kramer, in the county of Lancaster and State of Nebraska, have invented a new and Improved Gopher-Trap, of which the following is a full, clear, and exact description.

This invention relates to means for killing a species of rodent known as the pocket gopher. This type of field rat burrows in the ground, and closes the mouth of its burrow with earth that it pushes in front after a burrow is extended and widened sufficiently to permit the animal to turn around. This species of gopher is very destructive of plants, particularly of growing crops of alfalfa, living upon the roots of the plants and of course killing or badly injuring them.

The purpose of this invention is to provide a gopher trap, well adapted to kill gophers of the pocket type, by taking advantage of the peculiar habit of the animal hereinbefore mentioned, and as is hereinafter fully described.

The invention consists in the novel construction and combination of parts, as is hereinafter described and defined in the appended claims.

Reference is to be had to the accompanying drawings forming a part of this specification, in which similar characters of reference indicate corresponding parts in both views.

Figure 1 is a sectional side view of the improved trap taken substantially on the central line 1—1 in Fig. 2, and Fig. 2 is a front view of the same, seen in direction of the arrow $x$ in Fig. 1.

An essential detail of the invention consists of an arched base piece 5, that is preferably formed of plate metal, and constitutes in use the top and sides of an artificial burrow, the dimensions of which are such as best adapt it for effective service. At the normally inner end of the arched base piece 5 a metal frame is secured, said frame consisting of two upright side members 6, 6 that are formed preferably from a single strip of plate metal that is bent at or near its center so as to produce an inverted arch $6^a$. Above and near the arch $6^a$ the side members 6, 6 embrace the depending side walls $5^a$ of the base piece 5, and are thereto secured by rivets $a$, or other suitable means.

The upper ends of the frame members 6, 6 are connected together by means of a yoke plate 7, that is flattened on the top, and from said top two legs depend that lap upon and are secured to the ends of the frame members by rivets $b$.

A stabbing fork is provided, having two tines 8, 8, preferably formed of a single wire rod that is bent into a flat loop $c$ at its longitudinal center, said loop spacing the tines apart in parallel planes.

Two spaced perforations $c'$ are transversely formed in the yoke plate 7, see Fig. 2, and similarly spaced perforations $c^2$, $c^3$, are respectively formed in the arched upper portion of the base piece 5, and the inverted arch $6^a$, these perforations loosely receiving the tines 8, 8 of the stabbing fork, the length of said tines permitting their downward insertion through the perforations. The tines 8, 8 also pass down through perforations in a yoke plate 9 which is secured thereon, the relative position of said yoke plate adapting it to closely approach the arched top portion of the base piece 5 when the fork tines 8, 8 are depressed sufficiently to pass through the perforations in the inverted arch $6^a$ on the upright frame of the trap, this adjustment of parts appearing in dotted lines in Fig. 1.

A pair of slide rods 10, 10, preferably formed of a single piece of heavy wire by bending it at its center into a flat loop $d$, are inserted upwardly through two spaced perforations $e$, $e$ formed in the yoke plate 9 in a plane at right angles with that occupied by the fork tines 8. The upper portions of the slide rods 10 pass through two spaced perforations in the yoke plate 7, and are twisted together as shown at $g$, the remaining portions $10^a$ being oppositely and laterally extended, forming a cross handle, as shown in Fig. 2.

A spirally coiled spring 11 is inserted under tension between the upper yoke plate 7 and the lower yoke plate 9, and it will be seen in dotted lines in Fig. 1 that the expansion of said spring will forcibly depress the tines 8 so as to pass their pointed free ends $h$ down through the inverted arched portion $6^a$ of the trap frame.

A trigger arm 12, preferably cut from plate metal, is rockably connected with the upright frame members 6 by a substantially V shaped hanger 13, which is formed of wire, and at each end is provided with a hook $i$ that engages a perforation in a respective frame member 6, as is clearly indicated in Fig. 2. The looped depending end of the hanger 13 passes through a transverse perforation in the trigger arm 12, near the upper outer corner thereof, as shown at $l$, and on the inner upper corner of said arm an ear $k$ is formed that is designed for an engagement with the lower side of an adjacent side edge of the lower yoke plate 9, as is clearly shown in Fig. 1.

There is a flat toe $m$ formed transversely on the lower end of the trigger arm 12, and the length of said arm is such that it will be outwardly and downwardly inclined when the toe $m$ rests on the upper side of the arched base piece 5, as shown in Fig. 1.

A tripping lever 14 is a completing detail of the trap, and as shown said lever that may with advantage be formed of plate metal of suitable width, is provided with a longitudinally disposed flange $14^a$ on the upper end thereof, that is loosely inserted in a longitudinal slot formed in the crown of the arched top of the base piece 5. The tripping lever near its flanged upper end is rockably secured so as to hang pendent in the space within the base piece 5, by a transverse pivot $n$ that is formed on a bracket plate $n'$ which is secured on the arched wall of the base piece, as indicated in Fig. 2, and as shown in Fig. 1, the end of the flange $14^a$, which is nearest the pendent end of the trigger arm 14, may receive the toe $m$ of said arm. The opposite end of the flange $14^a$ is so positioned with relation to the outer end of the slot in the base piece wherein said flange is rockably positioned, that when the body 14 of the tripping lever is vertically pendent, said end of the head flange $14^a$ will impinge upon the outer end of the slot, and prevent the lever from rocking toward the rear end of the trap, or in other words, toward the frame members 6, 6.

As before explained, the pocket gopher, after forming a burrow in the soil, reverses his position, and for the purpose of secreting the entrance to the burrow, pushes the earth he has dug into the mouth of the burrow, and then proceeds to devour the roots of plants such as alfalfa, thus destroying them.

The improved trap, that is specially designed for killing pocket gophers, is arranged for service as follows: Having first set the trap as shown in Fig. 1, the operator locates the closed mouth of a burrow, which will indicate that the gopher is in it. An excavation is now made so as to permit the trap to be seated at or near the entrance of the burrow, the base piece 5 being extended outward so as to form an artificial burrow, while the frame and stabbing fork are positioned farther in the burrow, ample space therein being provided for the free passage of the animal outward or into the artificial burrow. The instinctive habit of the animal will induce it to carry any loose earth left in the burrow out into the artificial burrow, and in the act of pressing the earth against the pendent lever 14, will rock it toward the outer end of the base piece 5, as is shown by dotted lines in Fig. 1, which will depress the toe on the flange $14^a$, and release the trigger arm 12, whereupon the spring 11 will forcibly expand and drive the pointed ends of the tines 8 downward.

It will be seen that the pendent tripping lever 14 is positioned at such a distance from the tines 8 that the gopher while at work pressing the soil against said lever, will be located below the tines, so that when the trap is sprung said tines will pierce the body of the animal and kill it.

Having thus described my invention, I claim as new and desire to secure by Letters Patent:

1. In a trap, the combination with an arched base piece adapted to form an artificial burrow, and an elongated frame comprising upright side members secured on the base piece at one end thereof, the said side members having a connecting member at their lower ends extending beneath the base piece and provided with perforations, and a perforated yoke plate connecting the upper ends of the side members, the arched base plate having perforations in line with the perforations in the top and bottom of the said frame, of a spring pressed stabbing fork having spaced tines slidable through the said perforations, means for securing the said fork elevated against the tension of its spring and means operated by an animal for releasing the securing means.

2. In a trap, the combination with an arched base piece formed of metal and having an elongated body, an upright frame having side members embracing the arched base piece at one end and secured thereto, the said frame, having a member connecting the lower ends of the side members and extending beneath the arched base piece, and a member connecting the side members at the top, a stabbing fork vertically slidable in the frame, and a spring for pressing the fork downward, of a substantially V-shaped hanger provided at its ends with hooks engaging perforations in the respective side members of the frame, a rockable trigger arm through which the said hanger passes, the said trigger arm engaging the supporting means for the spring pressed fork, and a tripping lever pendent in the arched base piece and adapted to engage the lower end of the trigger arm.

3. The combination with an arched base piece adapted to form an artificial burrow, and an elongated ring-shaped frame secured near its lower looped end on one end of the base piece and disposed vertically thereon, of a stabbing fork having two spaced tines sharpened at their free lower ends, and slidable through the upper and lower members of the frame, a bifurcated handle the upper ends of which are twisted together and then bent oppositely outward to form a cross handle, a coiled spring encircling the handle and tines, a yoke plate on which the spring seats, a trigger arm rockable on the upright members of the trap frame and having an ear that may engage the yoke plate, said arm at the lower end having a toe, and a tripping lever pivoted in a slot in the crown of the arched base piece, said lever having a head flange with a latch toe thereon that may engage the toe on the lower end of the trigger arm and detachably hold the fork raised against the tension of the expansible spring.

4. In a trap, the combination with a base piece, an upright frame on the base piece, and a spring pressed stabbing fork vertically slidable in the frame, of a yoke plate secured to the fork, a trigger arm, a hanger connecting the trigger arm with the frame, the upper end of the trigger arm being adapted to engage said yoke plate, the trigger arm at the lower end having a toe, and a pivoted tripping lever having a body pendent in the base piece and a head fitting loosely in a longitudinal slot in the top of the base piece, the said head having a member for engaging the toe of the trigger arm and a member adapted when the body of the tripping lever is vertically pendent to impinge upon the wall of the slot at one end thereof.

In testimony whereof I have signed my name to this specification in the presence of two subscribing witnesses.

ANTON F. RENKEN.

Witnesses:
F. A. THOMPSON,
PAUL BECK.